(12) United States Patent
Yoshida

(10) Patent No.: US 6,407,827 B1
(45) Date of Patent: Jun. 18, 2002

(54) DATA COMMUNICATING APPARATUS CAPABLE OF STORING A PLURALITY OF TRANSMISSION DATA AND HAVING FUNCTION TO COLLECTIVELY TRANSMIT A PLURALITY OF TRANSMISSION DATA TO SAME DESTINATION

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/027,896

(22) Filed: Feb. 23, 1998

(30) Foreign Application Priority Data

Feb. 24, 1997 (JP) .............................................. 9-055618

(51) Int. Cl.7 ................................................ H04N 1/00
(52) U.S. Cl. ........................................ 358/404; 358/405
(58) Field of Search ................................ 370/432, 352, 370/392, 389, 524; 379/100, 100.01; 358/444, 404–405, 435, 436

(56) References Cited

U.S. PATENT DOCUMENTS 4,998,245 A * 3/1991 Tanaka et al. .............. 370/432
5,204,895 A * 4/1993 Yoshiura .................... 379/100
5,671,270 A   9/1997 Yoshida ..................... 379/100
5,872,641 A * 2/1999 Ozeki et al. ................ 358/434
5,963,340 A * 10/1999 Kim .......................... 358/440

* cited by examiner

Primary Examiner—Chau Nguyen
Assistant Examiner—Alexander O. Boakye
(74) Attorney, Agent, or Firm—Fitzpatrick, Cella, Harper & Scinto

(57) ABSTRACT

According to the invention, there is provided a data communicating apparatus which has a collective transmitting function for collectively transmitting a plurality of data to the same destination, can set first information to identifying the transmission data or second information to limit an access to the transmission data into data to be transmitted, and transmits the set first or second information by a communicating procedure, wherein when the collective transmission is executed, whether the first or second information set in each of the plurality of data or not is discriminated, and the collective transmission is executed in accordance with the discrimination result, thereby enabling the two functions to be properly executed.

15 Claims, 5 Drawing Sheets

DATA COMMUNICATING APPARATUS CAPABLE OF STORING A PLURALITY OF TRANSMISSION DATA AND HAVING FUNCTION TO COLLECTIVELY TRANSMIT A PLURALITY OF TRANSMISSION DATA TO SAME DESTINATION

BACKGROUND OF THE INVENTION

1. Field of the Invention

The invention relates to a data communicating apparatus which can store a plurality of transmission data and has a function to collectively transmit the plurality of transmission data to the same destination.

2. Related Background Art

Hitherto, as such a kind of apparatus, for example, a facsimile apparatus has been known.

In the conventional facsimile apparatus, when an auto-dialing process by a designated telephone number is executed, if a plurality of transmission image data with the same telephone number designated is stored in a memory, such a plurality of transmission image data is collectively transmitted by an auto-dialing process of one time. That is, there are not preformed such processes that the auto-dialing process is executed every transmission image data and each transmission image data is transmitted by an individual communication, but the plurality of transmission image data is transmitted as a series of transmission data by the auto-dialing process of one time, thereby improving a transmitting efficiency.

However, according to the foregoing facsimile apparatus, since the transmission image data with the same telephone number to be automatically dialed is merely selected and is collectively transmitted, the plurality of transmission image data received is merely outputted as a series of image data at the receiver end to which the image data is collectively transmitted.

In a facsimile apparatus of the G3 standard of the ITU-T recommendation, image data with a subaddress signal or a password signal set therefor can be transmitted. Since the subaddress signal or password signal can be individually set to each transmission image data, in case of transmitting a partner destination such that one facsimile apparatus connected to one telephone line is shared by a plurality of users, a specific user in the plurality of users can be designated by the subaddress signal to transmit image data, and an access to only specific transmission image data can be limited by the password signal.

If the above construction such that a plurality of transmission image data is collectively transmitted in accordance with the telephone number to be automatically dialed is also simply applied to transmission image data with the subaddress signal or password signal set, the subaddress signal or password signal set in each transmission image data is transmitted without being ulitized.

SUMMARY OF THE INVENTION

It is an object of the invention to improve a data communicating apparatus in consideration of the foregoing problems.

Another object of the invention is that in the case where a plurality of data to be transmitted to the same destination set, a collective transmitting function to collectively transmit the plurality of data is provided, and in the case where first information (for example, subaddress signal) to distinguish (or identify) data to be transmitted or second information (for instance, password signal) to limit an access to the data set into such data, the collective transmitting process and the transmission of the first and second information can be properly executed.

Still another object of the invention is to provide a data communicating apparatus with in a plurality of data to the same destination, data with the same first or second information set is used as a target of a collective transmission.

Further another object of the invention is to provide a data communicating apparatus with in case of collectively transmitting data with the first or second information set, consistency of the first or second information is checked, and either (1) to change a communication mode and transmit the first or second information before transmission of each data, or (2) to transmit the data without changing the communication mode, is selectively executed in accordance with a check result.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described in detail hereinbelow with reference to the drawings. A facsimile apparatus will be explained as an example in the following embodiments.

Figure 1:
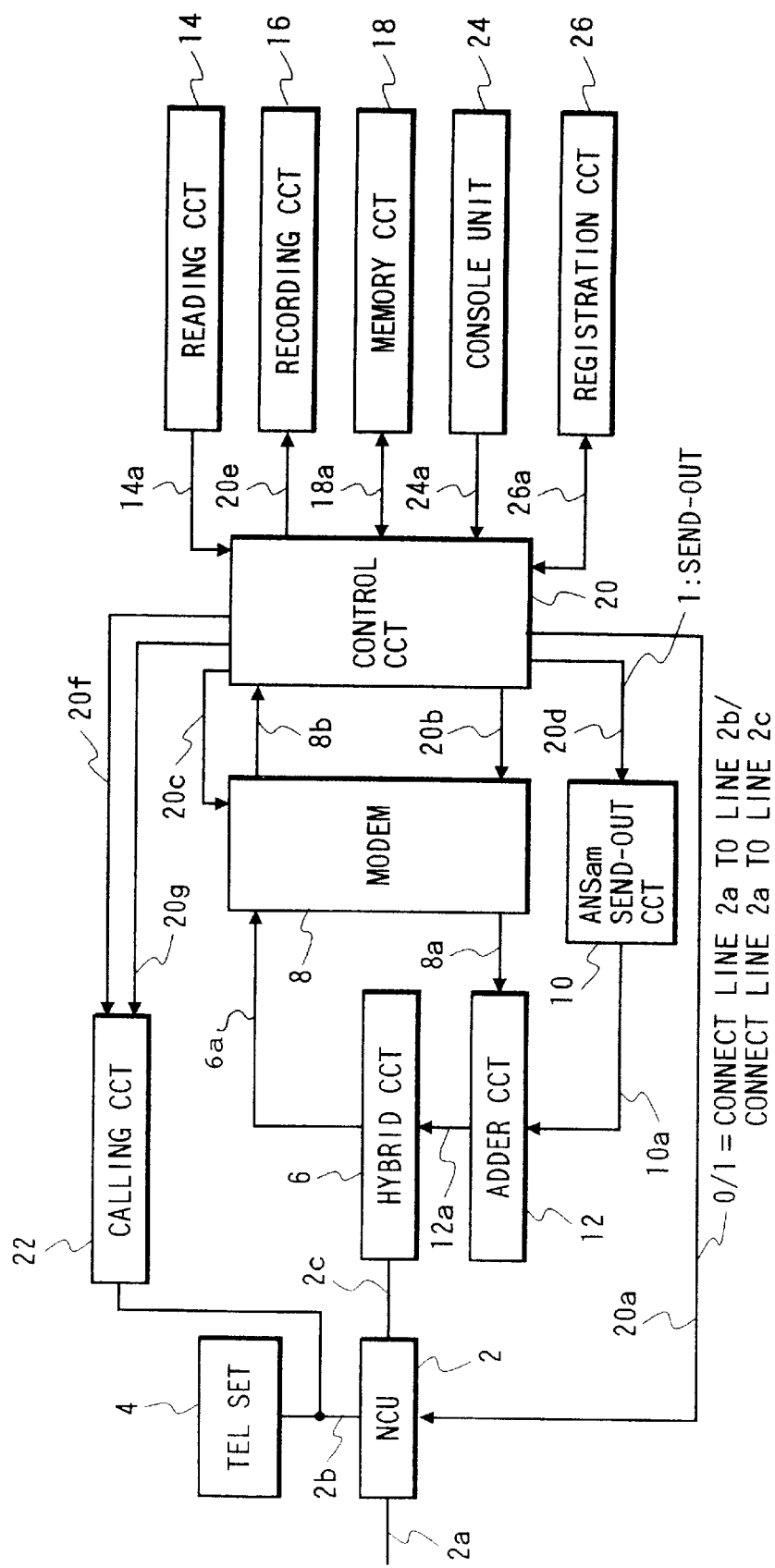
FIG. 1 is a block diagram showing a construction of a facsimile apparatus according to an embodiment of the invention.

FIG. 1 is a block diagram showing a construction of a facsimile apparatus according to an embodiment of the invention.

An NCU (network control unit) 2 is connected to a terminal of a telephone line in order to use a telephone network for data communication or the like and executes a connection control of a telephone exchange network, a switching to a data communication path, and a holding of a loop. When a signal level (signal line 20a) from a control circuit 20 is equal to "0", the NCU 2 connects a telephone line 2a to a telephone set 4 side. When the signal level is equal to "1", the NCU 2 connects the telephone line 2a to the facsimile apparatus side. In the ordinary state, the telephone line 2a is connected to the telephone set 4 side.

A hybrid circuit 6 separates a signal of the transmitting system and a signal of the receiving system, transmits a transmission signal from an adder circuit 12 to the telephone line 2a via the NCU 2, receives a signal from the partner side via the NCU 2, and sends to a modem 8 via a signal line 6a.

The modem 8 executes modulation and demodulation based on V.8, V.21, V.27ter, V.29, V.17, and V.34 of the ITU-T recommendation. Each transmitting mode is designated by a signal line 20c. The modem 8 inputs a signal outputted to a signal line 20b, outputs modulation data to a signal line 8a, inputs a reception signal outputted to the signal line 6a, and outputs demodulation data to a signal line 8b.

An ANSam send-out circuit 10 is a circuit to send out an ANSam signal. When a signal at the signal level "1" is outputted to a signal line 20d, the ANSam send-out circuit 10 transmits the ANSam signal to a signal line 10a. When a signal at the signal level "0" is outputted to the signal line 20d, the send-out circuit 10 does not output any signal to the signal line 10a.

The adder circuit 12 inputs information on the signal line 8a and information on the signal line 10a and outputs an addition result to a signal line 12a. A reading circuit 14 reads an image of an original and outputs the read image data to a signal line 14a. A recording circuit 16 sequentially records information outputted to a signal line 20e every line.

A memory circuit 18 is used to store raw information of the read data or coded information thereof or to store received information, decoded information, or the like.

When a call command pulse is generated to a signal line 20g, a calling circuit 22 inputs telephone number information outputted to a signal line 20f and outputs a selection signal to a signal line 2b.

A console unit (or operation unit) 24 has a one-touch dial, an abbreviation dial, a ten-key, a *•# key, a set key, a start key, a subaddress signal input key, a password signal input key, and other function keys. Information corresponding to the depressed key is outputted to a signal line 24a.

A registration circuit 26 is a circuit such that when a plurality of memory transmissions exist in correspondence to a call destination and the password signals or subaddress signals differ, whether or not data can be transmitted as one communication, accompanied by a mode change, or not is registered via a signal line 26a.

The control circuit 20 controls the collective communicating operation in each embodiment of the invention. Particularly, in the first embodiment, the control circuit 20 executes a control in a manner such that when a plurality of memory transmissions to the same destination are in a standby state, when the subaddress signal or password signal is the same, those information is collectively transmitted and when the subaddress signals or password signals differ, those information is not collectively transmitted.

Figure 2:
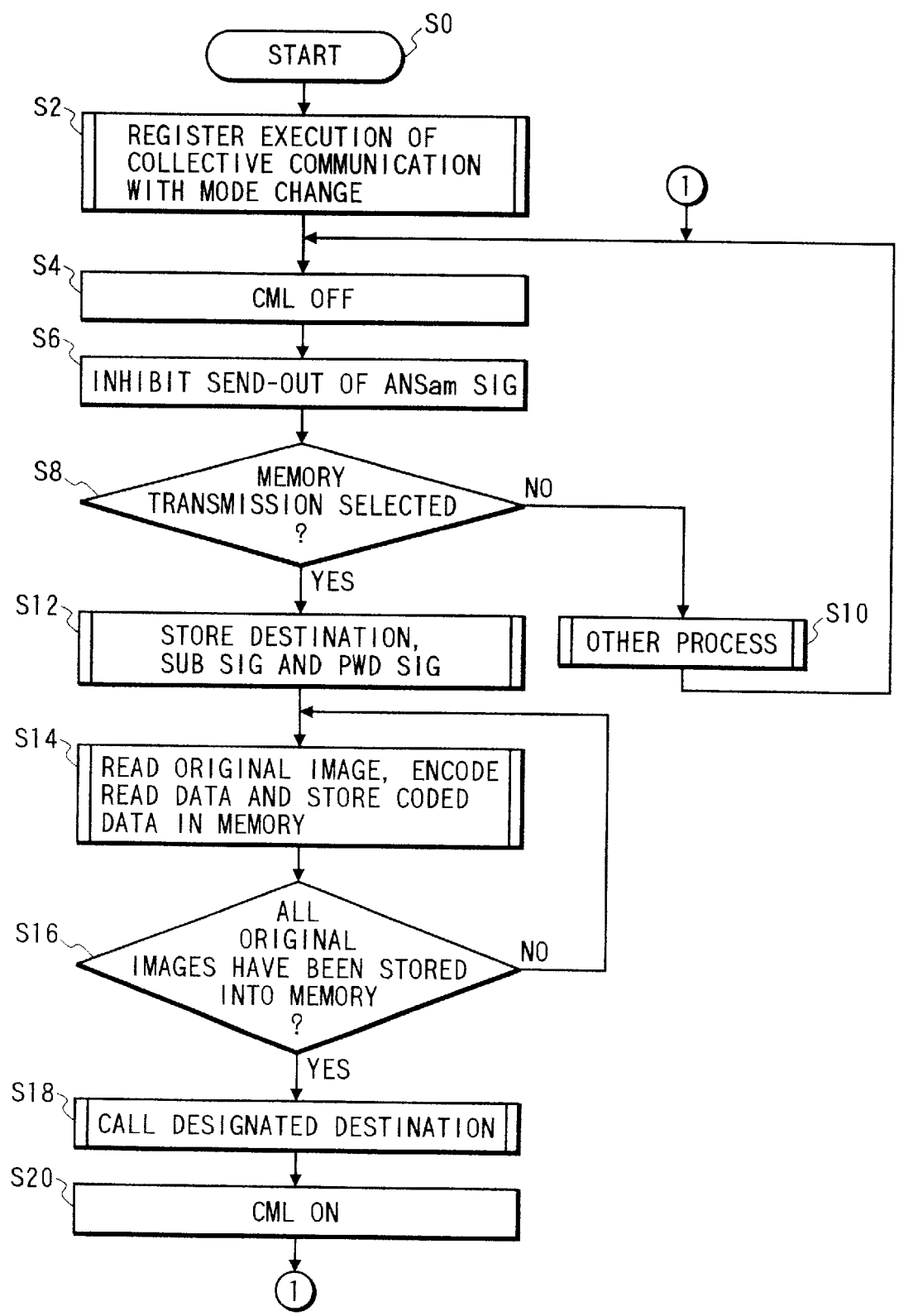
FIG. 2 is a flowchart showing the control operation of a control circuit of the first embodiment of the invention.
Figure 3:
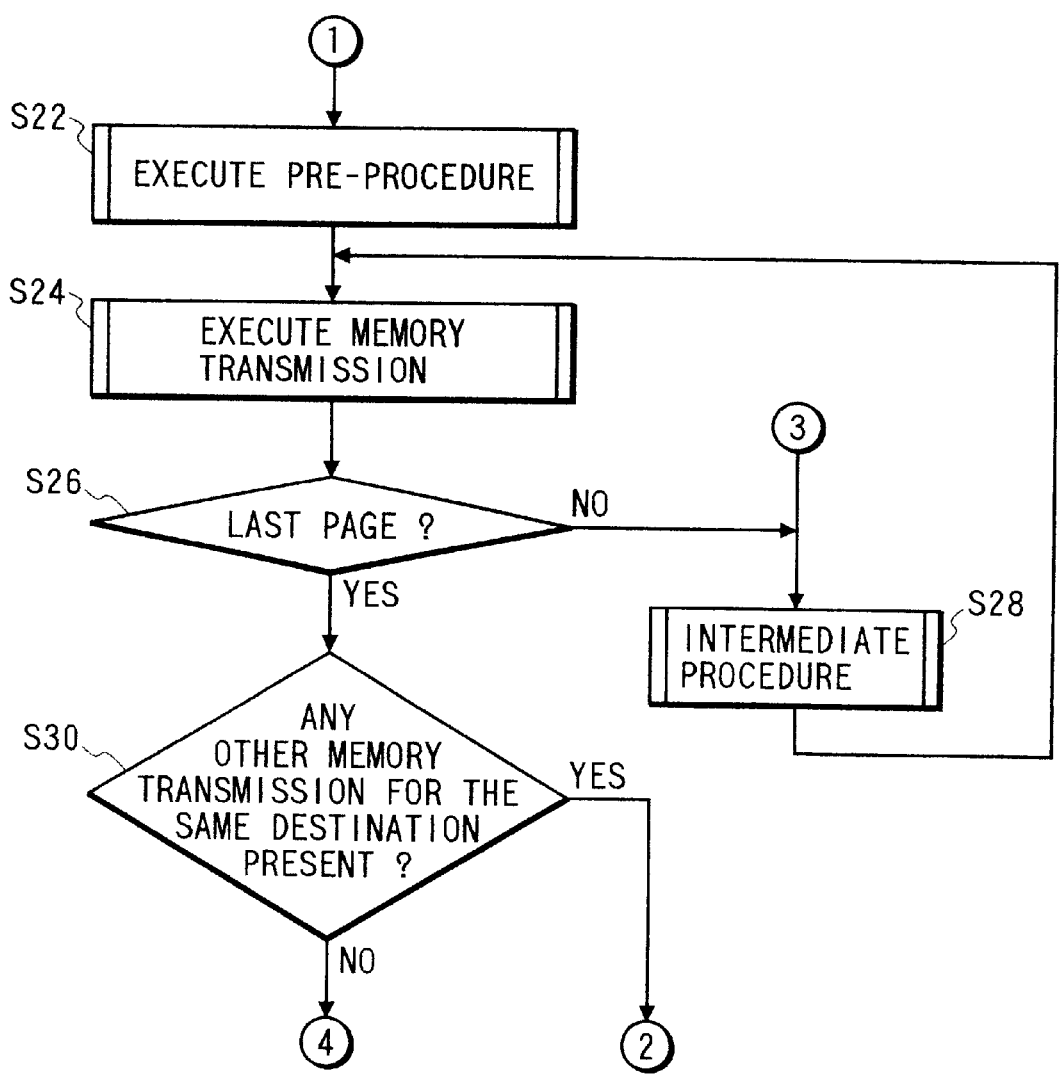
FIG. 3 is a flowchart showing the control operation of a control circuit of the first embodiment of the invention.
Figure 4:
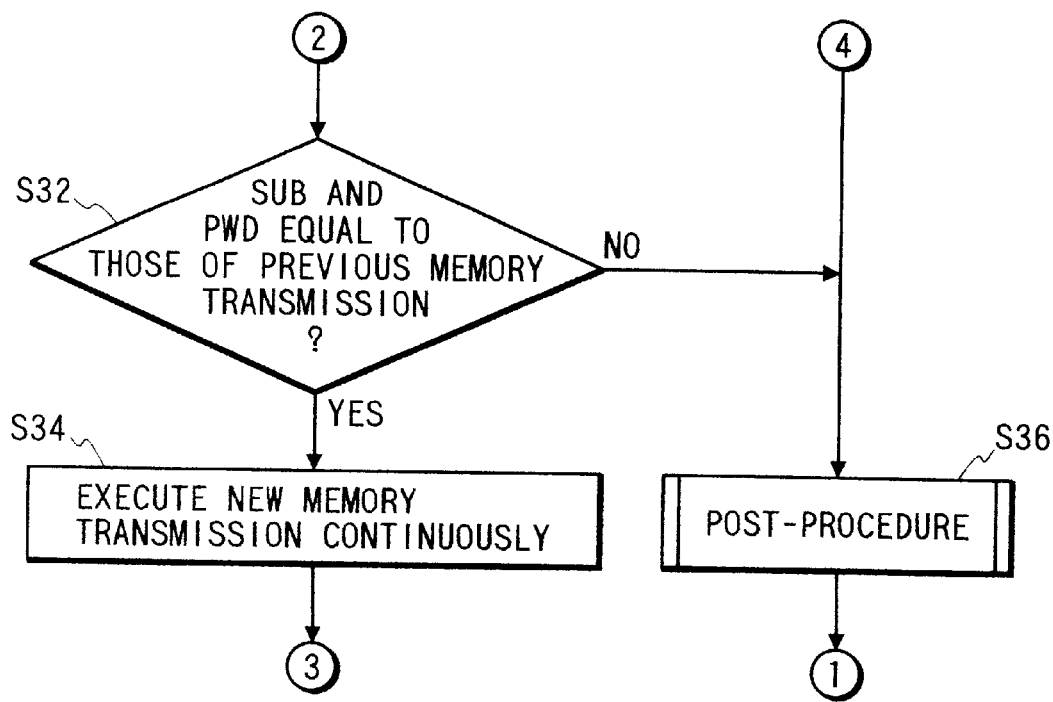
FIG. 4 is a flowchart showing the control operation of a control circuit of the first embodiment of the invention.

FIGS. 2 to 4 are flowcharts showing a flow of the control of the control circuit 20 in the first embodiment. Processes shown in the flows of FIGS. 2 to 4 are executed when a microcomputer of the control circuit 20 performs a computer program stored in an ROM (read only memory) of the control circuit 20.

First in FIG. 2, the operation is started in step S0. In step S2, in the case where a plurality of memory transmissions with the subaddress signals or password signals differ exist in correspondence to the call destination, the operator registers a fact that the information is transmitted by changing the mode in a collective communication, into the registration circuit 26 through the signal line 26a for all of the destinations.

In step S4, the CML is turned off by outputting a signal at the signal level "0" to the signal line 20a. In step S6, a signal at the signal level "0" is outputted to the signal line 20d, thereby setting a state with the ANSam signal is not sent out.

In step S8, the signal on the signal line 24a is inputted and whether the memory transmission has been selected or not is discriminated. When the memory transmission is selected, step S12 follows. When the memory transmission is not selected, step S10 follows and the other process is executed. The processing routine is returned to step S4.

In step S12, the signal on the signal line 24a is inputted and a destination to be called, the subaddress signal, and the password signal are stored. In step S14, the original information is read and coded and stored into the memory.

In step S16, a check is made to see if the storage of all of the original information into the memory has been finished. When it is not yet finished, step S14 follows. If YES, step S18 follows and a call is generated to the designated destination in step S12 by using the calling circuit 22.

In step S20, a signal at the signal level "1" is outputted to the signal line 20a and the CML is turned on. In step S22, a pre-procedure is executed. In this step, the SUB signal and PWD signal designated in step S12 are transmitted. Further, when a new memory transmission is selected, the call destination, SUB signal, and PWD signal are registered and, after that, the transmission information is read and coded and stored into the memory.

Step S24 shows a memory transmission. When a new memory transmission is also selected here, the call destination, SUB signal, and PWD signal are registered and, after that, the transmission information is read, coded and stored into the memory.

In step S26, whether the reading image is the original of the last page or not is discriminated. When it is the original of the last page, step S30 follows. If NO, step S28 follows.

Step S28 shows an intermediate procedure. Specifically speaking, a PPS-MPS signal is transmitted and an MCF signal is received.

In step S30, a check is made to see if any other memory transmissions to the same destination exist. If YES, step S32 follows. If NO, step S36 follows.

In step S32, a check is made to see if the SUB signal and PWD signal set by the other memory transmission are the same as the SUB signal and PWD signal transmitted by the pre-procedure of the original information which has been transmitted so far. When they are the same, step S34 follows. The new memory transmission is also set to a mode for perform the collective transmission and the processing routine advances to step S28 mentioned above.

When either one of the SUB signal and the PWD signal differs, step S36 follows. Step S36 shows a post-procedure. Specifically speaking, a PPS-EOP signal is transmitted and an MCF signal is received.

The second embodiment of the invention will now be described.

In the second embodiment, when a plurality of memory transmissions to the same destination are in a standby state, if the subaddress signal or password signal is the same, those information is transmitted without changing the mode. When the subaddress signals or password signals differ, the mode is changed and the information is transmitted.

Figure 5:
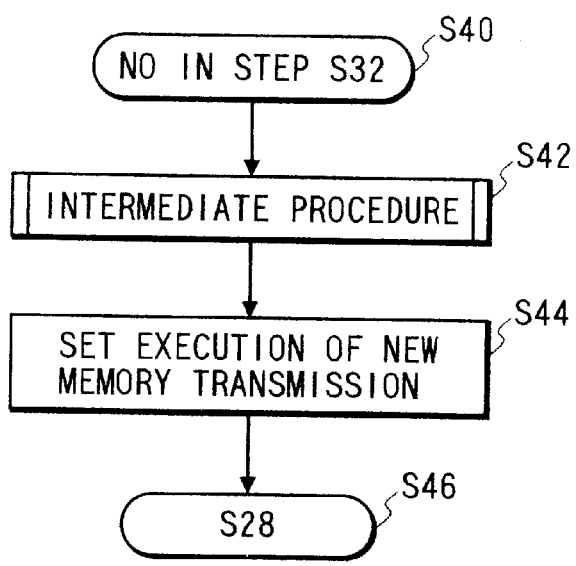
FIG. 5 is a flowchart showing the control operation of a control circuit of the second embodiment of the invention.

FIG. 5 is a flowchart showing a portion different from the first embodiment (FIGS. 2 to 4) in the control of the second embodiment as mentioned above.

In FIG. 5, step S40 shows NO in step S32. In step S42, the intermediate procedure is executed. Specifically speaking, a PPS-EOP signal is transmitted, an MCF signal and a DIS signal are received, the subaddress signal and password signal set by the new memory transmission are transmitted as SUB, PWD, and DCS signals, and subsequently, a Tr•TCF signal is transmitted and a CFR signal is received. In step S44, the apparatus is set into a mode for performing the new memory transmission. In step S46, the processing routine advances to step S28.

The third embodiment of the invention will now be described.

In the third embodiment, the communication in the second embodiment mentioned above is executed and in the case where the subaddress signals or password signals differ and a communication error occurs by transmitting after the mode was changed, the collective transmission is executed for the subsequent same destination on the basis of the foregoing first embodiment.

Figure 6:
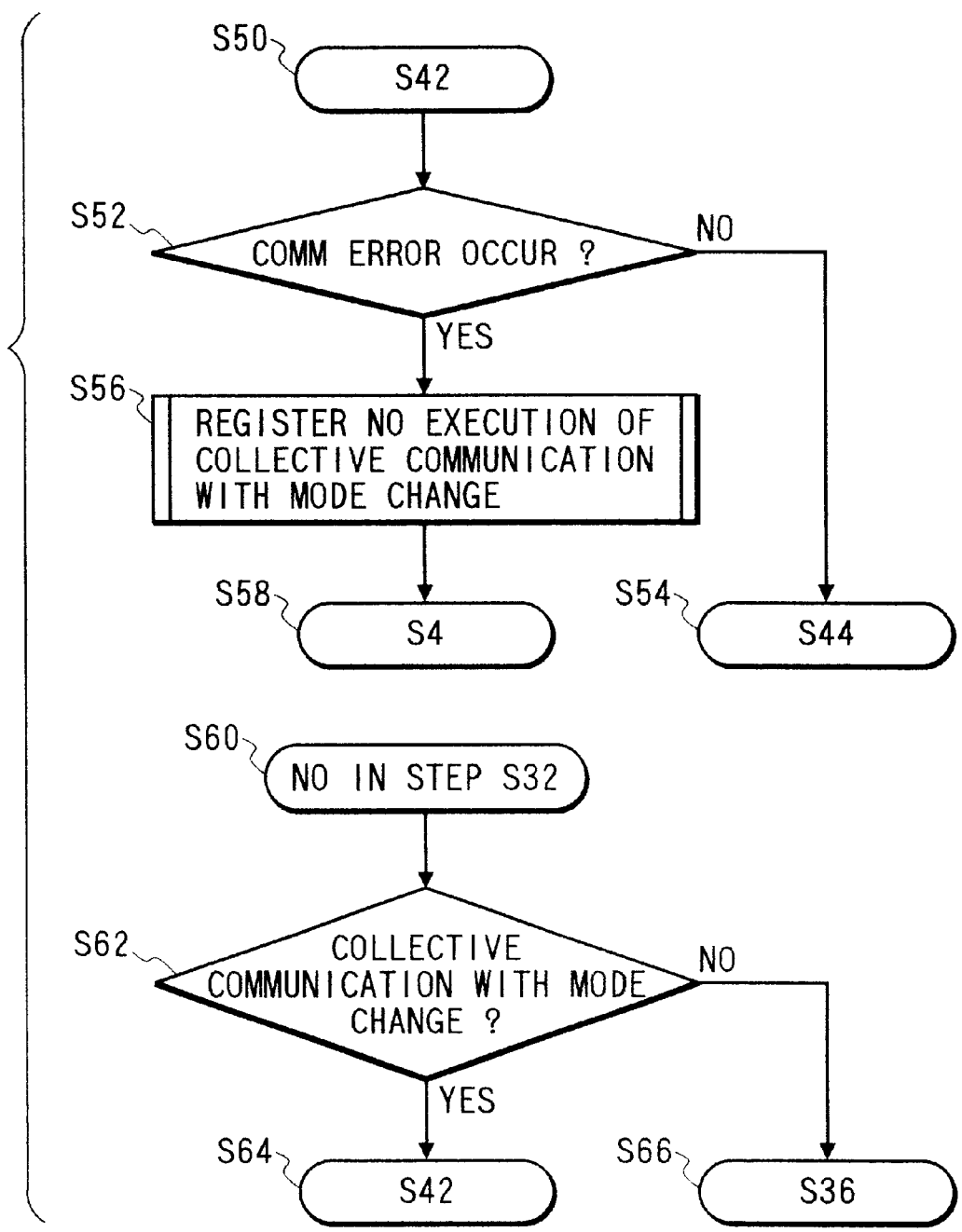
FIG. 6 is a flowchart showing the control operation of a control circuit of the third embodiment of the invention.

FIG. 6 is a flowchart showing a portion different from the first and second embodiments (FIGS. 2 to 5) in the control of the third embodiment as mentioned above.

In FIG. 6, step S60 shows step S42 mentioned above. In step S52, since the PWD signal or SUB signal differs, the mode change by the operation in the second embodiment has been performed. However, a check is made to see if a communication error due to the mode change has occurred. If no communication error occurs, step S54 (S44) follows. When a communication error occurs, step S56 follows.

In step S56, in the case where a plurality of memory transmissions to the relevant destination are in the standby state through the signal line 26a and their subaddress signals or password signals differ, it is stored in the registrative circuit 26 that not transmission as a collective communication accompanied by a mode change but re-calling after disconnection is executed.

In step S58, the processing routine advances to step S4 mentioned above. After that, step S60 shows NO in step S32. In step S62, the information on the signal line 26a is inputted and whether or not regarding the destination connected at present, such a mode is set that in the case where a plurality of memory transmissions exist and the password signals or subaddress signals differ, the information is transmitted as a collective communication with a mode change is discriminated on the basis of the contents registered in the registration circuit 26. When the mode is set for the destination, step S64 (S42) follows. If NO, step S66 (S36) follows.

When an error occurs by the control of the second embodiment, the apparatus is switched to the control of the first embodiment, thereby enabling a certain communicating operation to be obtained.

In the above embodiments, although the facsimile apparatus of the stand-alone type has been described as an example, the invention is not limited to it. It will be obviously understood that the invention can be applied to a data communication control in an integrated data processing system in which, for example, a copying function, an electronic filing function, and further, a data processing function are combined with a communicating function.

As described above, so long as the same subaddress signal or password signal, since the mode is the same and the password is the same, the collective transmission can be performed. Therefore, by executing the collective transmission with respect to those memory transmission information, a covering range of the collective transmission can be widened.

In the communication to the same destination, even if the subaddress signals or password signals differ, the information can be transmitted as a collective communication and the communication costs can be reduced.

When a plurality of memory transmissions to the same destination are selected, so long as the same subaddress signal or password signal, the collective transmission is performed. Further, when the transmission of the different subaddress signal or password signal is selected, if possible, the mode is changed and the information is transmitted as a collective communication. If impossible, another communication can be carried out. The memory transmitting function can be flexibly operated.

The present invention is not limited to the foregoing embodiments but many modifications and variations are possible within the spirit and scope of the appended claims of the invention.

What is claimed is:

1. A data communication apparatus with a collective transmission function for collectively transmitting a plurality of data to a same destination, said apparatus comprising:

setting means for setting into data to be transmitted identification information for identifying the data to be transmitted or password information for limiting access to the data to be transmitted;

transmitting means for transmitting the identification information or the password information set by said setting means by a communication procedure; and control means for discriminating whether or not the identification information or the password information is set in each of a plurality of data, and for allowing a collective transmission process of the plurality of data to be executed in accordance with a discrimination result when performing collective transmission of the plurality of data by the collective transmission function, wherein the collective transmission process combines the plurality of data into a combination and transmits the combination as one data.

2. An apparatus according to claim 1, wherein said control means discriminates whether the identification information or the password information is set in each of the plurality of data, selects data for which information of a same content has been set, and allows the collective transmission process to be executed.

3. An apparatus according to claim 2, wherein said control means allows data, for which the identification information or the password information of different contents has been set in the plurality of data, to be transmitted to the same destination by different communications, respectively.

4. An apparatus according to claim 2, wherein, when continuously transmitting to the same destination data in which the identification information or the password information of a same content has been set in the plurality of data, execution of the communication procedure by said transmitting means is omitted for the plurality of data, on the other hand, and wherein, when transmitting a plurality of data in which the identification information or the password information of different contents has been set, the communication procedure is executed by said transmitting means for the plurality of data.

5. An apparatus according to claim 1, wherein the identification information is a subaddress signal of facsimile and the password information is a password signal of facsimile.

6. An apparatus according to claim 4, wherein, when the transmitting means executes the communication procedure for the plurality of data, a procedure signal to change a communication mode is transmitted and, after that, the identification information or the password information set in the data to be transmitted is transmitted by said transmitting means.

7. A transmission method for a data communication apparatus with a collective transmission function for collectively transmitting a plurality of data to a same destination, said method comprising:

a setting step of setting into data to be transmitted identification information for identifying the data to be transmitted or password information for limiting access to the data to be transmitted;

a transmission step of transmitting the identification information or the password information set in said setting step by a communication procedure; and a control step of discriminating whether or not the identification information or the password information is set in each of a plurality of data, and of allowing a collective transmission process of the plurality of data to be executed in accordance with a discrimination result when performing collective transmission of the plurality of data by the collective transmission function, wherein the collective transmission process combines the plurality of data into a combination and transmits the combination as one data.

8. A method according to claim 7, wherein said control step includes discriminating whether or not the identification information or the password information is set in each of the plurality of data, selecting data for which information of a same content has been set, and executing the collective transmission process.

9. A method according to claim 8, wherein said control step allows data, for which the identification information or the password information of different contents has been set in the plurality of data, to be transmitted to the same destination by different communications, respectively.

10. A method according to claim 8, wherein, when continuously transmitting to the same destination data in which the identification information or the password information of the same content has been set in the plurality of data, execution of the communication procedure to transmit the identification information or the password information is omitted for the plurality of data, and wherein, when transmitting a plurality of data in which the identification information or the password information of different contents has been set, the communication procedure to transmit the identification information or the password information is executed for the plurality of data.

11. A method according to claim 7, wherein the identification information is a subaddress signal of facsimile and the password information is a password signal of facsimile.

12. A method according to claim 10, wherein, when executing the communication procedure for the plurality of data, a procedure signal to change a communication mode is transmitted and, after that, the identification information or the password information set in the data to be transmitted is transmitted by the communication procedure.

13. A communication method comprising a transmission step of transmitting data using a subaddress signal and a password signal, wherein, in a case where a plurality of memory transmissions to a same destination are in a standby state, when each of the plurality of memory transmissions has a same subaddress signal and a same password signal, the plurality of memory transmissions is collectively transmitted, and, when the plurality of memory transmission has different subaddress signals or different password signals, the plurality of memory transmissions is not collectively transmitted.

14. A communication method comprising a transmission step of transmitting data using a subaddress signal and a password signal, wherein, in a case where a plurality of memory transmissions to a same destination are in a standby state, when each of the plurality of memory transmissions has a same subaddress signal and a same password signal, the plurality of memory transmissions is transmitted without a mode change, and, when the plurality of memory transmissions has different subaddress signals or different password signals, the plurality of memory transmissions is transmitted with a mode change.

15. A communication method of transmitting data using a subaddress signal and a password signal, said method comprising:

a first transmission control method in which, in a case where a plurality of memory transmissions to a same destination are in a standby state, when each of the plurality of memory transmissions has a same subaddress signal and a same password signal, the plurality of memory transmissions is collectively transmitted, and, when the plurality of memory transmissions has different subaddress signals or different password signals, the plurality of memory transmissions is not collectively transmitted; and a second transmission control method in which, in a case where the plurality of memory transmissions to the same destination are in the standby state, when each of the plurality of memory transmissions has the same subaddress signal and the same password signal, the plurality of memory transmissions is transmitted without a mode change, and, when the plurality of memory transmissions has different subaddress signals or different password signals, the plurality of memory transmissions is transmitted with a mode change, wherein, in a case where a communication error occurs when executing a transmission by said second transmission control method and with a mode change because the subaddress signals or the password signals differ, collective transmission is executed to the same destination based on said first transmission control method after error.

* * * * *